US005164126A

United States Patent [19]

Kalishek et al.

[11] Patent Number: 5,164,126

[45] Date of Patent: Nov. 17, 1992

[54] PROCESS FOR MICROENCAPSULATION

[75] Inventors: Robert J. Kalishek; Donald E. Hayford, both of Appleton, Wis.

[73] Assignee: Appleton Papers Inc., Appleton, Wis.

[21] Appl. No.: 665,206

[22] Filed: Mar. 5, 1991

[51] Int. Cl.[5] .......................... B01J 13/16; B01J 13/20

[52] U.S. Cl. ...................................... 264/4.7; 264/4.3; 264/4.32; 264/4.33; 428/402.21; 503/215

[58] Field of Search ...................... 264/4.3, 4.32, 4.33, 264/4.7

[56] References Cited

U.S. PATENT DOCUMENTS

| | | | |
|---|---|---|---|
| 3,429,827 | 2/1969 | Ruus | 264/4.7 X |
| 3,432,327 | 3/1969 | Kan et al. | 264/4.7 X |
| 3,577,515 | 5/1971 | Vandegaer | 264/4.7 X |
| 3,886,085 | 5/1975 | Kiritani et al. | 264/4.7 |
| 4,076,774 | 2/1978 | Short | 264/4.32 X |
| 4,140,516 | 2/1979 | Scher | 264/4.7 |
| 4,253,682 | 3/1981 | Baatz et al. | 264/4.7 X |
| 4,280,833 | 7/1981 | Beestman et al. | 264/4.7 X |
| 4,285,720 | 8/1981 | Scher | 264/4.7 X |
| 4,428,978 | 1/1984 | Jabs et al. | 264/4.7 X |
| 4,563,212 | 1/1986 | Becher et al. | 71/118 |
| 4,643,764 | 2/1987 | Scher | 264/4.7 X |
| 4,761,255 | 8/1988 | Dahm et al. | 264/4.7 |
| 4,940,739 | 7/1990 | Seitz | 264/4.7 X |

*Primary Examiner*—Richard D. Lovering
*Attorney, Agent, or Firm*—Benjamin Mieliulis

[57] ABSTRACT

An improved process for producing by interfacial reaction, a high solids an aqueous slurry of microcapsules is disclosed. Typical interfacial reaction involves the steps of emulsifying an oil phase containing the material to be encapsulated plus an oil-soluble, film-forming polyisocyanate in a continuous aqueous phase containing an emulsifying polymer under high shear conditions until the desired droplet size is obtained and then, under low shear conditions, adding a polyamine solution followed by an elevated temperature reaction sufficient to complete hardening of the polyurea capsule walls. The improvement of the invention comprising the introduction of a reaction period at elevated temperature between emulsification and polyamine addition, said reaction period permitting capsules of 10 microns or less average diameter to be made at greater than 40% by weight solids without agglomeration or resultant excess viscosity.

8 Claims, No Drawings

PROCESS FOR MICROENCAPSULATION

BACKGROUND OF THE INVENTION

1. Field of Invention

This invention relates to a process for formation of microcapsules. More particularly, this invention relates to an improved process for microencapsulation by interfacial reaction. The invention is particularly applicable to encapsulations wherein the continuous phase is the aqueous phase, and the aqueous phase reactant is a polyamine. The oil phase reactant is a polyisocyanate.

2. Description of the Prior Art

United Kingdom patent 950,443 MacKinney and U.S. Pat. No. 3,424,827 Ruus are some of the early teachings relating to interfacial encapsulation.

Early capsules for carbonless business forms were made using polyamines and acid chloride reactants. These processes, however, had acid generating side reactions undesirable in the presence of acid sensitive dyes.

Later, capsules were made from aliphatic polyamines and aliphatic polyisocyanates which react at the oil water interface to produce a polyurea wall. This process eliminates the acid generating side reactions. The use of the all aliphatic reactants appears to eliminate the slow discoloration which occurs with aromatic reactants. U.S. Pat. No. 4,761,255 Dahm describes a semi-continuous process to produce microcapsules using such reactants.

Two Monsanto patents, U.S. Pat. Nos. 4,280,833 and 4,563,212, describe increased solids for interfacial encapsulation processes by use of polyanionic emulsifiers. These processes, while perhaps useful for pesticide application where larger capsules and slow release are paramount, are not particularly suitable for microencapsulation for carbonless applications. In these processes, the unavoidable hydrolysis and decarboxylation of isocyanate reactant to amino, plus the presence of amino dyes renders the oil droplets slightly cationic. Anionic polymers bind to this cationic surface, forming a layer impeding emulsification and, after emulsification, diffusion of the polyamine reactant to the interface.

U.S. Pat. No. 4,428,978 teaches production of microcapsules by interfacial polyaddition of polyisocyanate and a hydrogen active compound. The polyisocyanate is an isocyanurate-containing aliphatic polyisocyanate. High encapsulation solids are taught, obtained by lowering the suspension pH to or below 7 after polyamine addition.

Improved processes for producing high solids aqueous suspensions of microcapsules would be of commercial significance.

SUMMARY OF THE INVENTION

The invention disclosed herein comprises an improved process for producing an aqueous suspension containing at least 40% by weight of microcapsules. The process comprises mixing an oil phase containing a colorless chromogenic material into an aqueous phase containing an emulsifying agent, droplet stabilizer or both. The oil phase is substantially immiscible in the aqueous phase and contains an oil phase reactant comprising an oil soluble film-forming polyisocyanate. The mixture is agitated under high shear to form droplets of the oil phase of about 10 micron average diameter or less. The rate of agitation is substantially reduced and the suspension allowed to react for at least about 15 minutes at elevated temperature of at least 35° C. Next, an aqueous phase reactant is added comprising an aliphatic polyamine.

DETAILED DESCRIPTION

This invention relates to encapsulation or microencapsulation involving the formation of a solid wall around small droplets of an immiscible oil dispersed in an aqueous phase. The process of the present invention is distinguishable from processes which involve aqueous droplets dispersed in an oil, which involve solid cores or liquid walls or even solids within solids that are labeled encapsulations.

Processes for encapsulation are commonly divided into three types according to how the wall is formed: coacervation, in-situ and interfacial. In coacervation processes, high molecular weight polymers are deposited around the oil droplets and subsequently cross-linked. In in-situ processes, low molecular weight materials are simultaneously reacted and deposited on the oil droplets. In interfacial processes, the reactants are added to different phases and react at the oil-water interface. Each type has characteristic advantages and disadvantages when used for the production of microcapsules for carbonless business forms. Coacervation processes are typically limited to less than 30% solids, require refrigeration and are not suitable for encapsulating polar solvents but often have certain quality advantages, particularly in printing operations. In-situ processes work at high solids with low cost materials but are not the best in terms of producing capsules which are resistant to accidental damage. Interfacial processes have hitherto been somewhat limited in solids but have the advantage of producing capsules with a uniform wall thickness relative to diameter regardless of capsule size. In the examples it will be shown how this advantage translates to improved resistance to accidental damage.

The invention is an improved process for microencapsulation by interfacial reaction. The improved process is applicable to encapsulations in which the continuous phase is the aqueous phase and in which the oil phase reactant is a polyisocyanate and the aqueous phase reactant is a polyamine. The improved process is particularly advantageous when small (less than 10u average diameter) capsules are made at high (greater than 40%) solids. These types of capsules are of interest to the manufacturers of capsules for carbonless business forms. Carbonless business forms are the biggest market, in volume and value, for microcapsules.

The invention is an improved process for producing by interfacial reaction an aqueous slurry of microcapsules, said process being of the type involving the steps of mixing an oil phase containing a material to be encapsulated and an oil-soluble, film-forming, polyisocyanate into a continuous aqueous phase containing an emulsifying agent to form a mixture, emulsifying the mixture under high shear agitation until oil droplets of 10 microns or less are obtained, and, adding, under reduced shear agitation, an aliphatic polyamine to form polyurea capsule walls followed by heating to harden the walls, the improvement comprising introducing a reaction period of at least 15 minutes at elevated temperature of at least 35° C. between the emulsifying step and the aliphatic polyamine addition step, whereby a nonagglomerated aqueous slurry of capsules of 10 microns or less average diameter is formed at greater than 40% by weight solids.

The reaction period is preferably not less than 15 minutes, and for purposes of economy, generally need not exceed about two hours at a temperature range of not less than 35° C. and not more than 70° C.

The preferred polyisocyanates is 1,6-hexane diisocyanate trimerized into an isocyanurate ring structure and derivatives thereof. The aliphatic polyamine is preferably selected from the group consisting of diethylenetriamine and tetraethylenepentamine.

The interfacial encapsulation process can be described in four steps. The first is solution preparation. The aqueous phase contains an emulsifying agent and droplet stabilizing agent or protective colloid. Usually, the two functions are combined in the form of a nonionic, water soluble polymer with surfactant properties. One such material is partially hydrolyzed polyvinyl alcohol (PVA), but many other types are well known. Other such materials, in addition to polyvinyl alcohol, include polyacrylamide, gelatin, gum arabic, starch, casein, carboxymethyl cellulose, hydroxyethyl cellulose, methyl cellulose, polyvinylpyrrolidone and the like. Additional mixtures with emulsifying materials can be used. Emulsifying materials can include alkyl sulphonates, alkylbenzene sulphonates, polyoxyethylene sulphonate, ethoxylated 3 - benzyl hydroxybiphenyl, sorbitan fatty acid ethers, polyoxyethylene alkylethers and ethoxylated nonylphenols. Using PVA is preferred. The oil, or internal phase, contains whatever is to be encapsulated. For carbonless business forms this means an oil solution of the potential color-formers in colorless form. The internal phase can be and often is a supersaturated solution. Usually, the oil phase reactant, an oil soluble polyisocyanate resin, is added just prior to the start of emulsification. The aqueous phase reactant, a low molecular weight, preferably aliphatic polyamine, is typically dissolved in a separate aqueous solution.

The second step is emulsification. The oil phase is added to the aqueous phase with some type of mixing action and the resulting coarse slurry is subjected to high speed, high shear agitation until the desired oil droplet size is obtained. Foaming can be minimized by maximizing the volume ratio of oil phase to aqueous phase. Cooling may be necessary to counteract the heat generated by emulsification.

The third step is polyamine addition. For this, the high shear agitation is stopped, to avoid damage to newly-formed capsule walls, and replaced by low or medium shear agitation. Irreversible capsule agglomeration is an inherent problem in this and the next step, minimized in the prior art by reducing solids and carefully controlling agitation and heat-up rate.

The fourth step could be called finishing, which means supplying whatever sufficient time and temperature conditions are necessary to harden the capsule walls. Sterically unhindered aliphatic polyisocyanates and polyamines react spontaneously at room temperature to form a polyurea capsule wall, but this wall is weak, permeable and contains unreacted amino and isocyanate groups which can come together only at higher temperatures. In addition, there are carbamate groups (formed during emulsification by the hydrolysis of isocyanates) which, at higher temperatures, decarboxylate to give primary amino groups which can in turn participate in wall formation through reaction with residual isocyanates.

In the patent literature there are interfacial encapsulation processes in which the third step, polyamine addition, is omitted completely. These processes depend on the above mentioned hydrolysis and decarboxylation reactions to supply all of the amino reactant required for wall formation. So far, these processes have not found commercial acceptance for the production of microcapsules for carbonless business forms.

There are commercial installations in which the second, third and fourth steps (emulsification, polyamine addition and heat-up) are done as a semi-continuous process in a series of small reactors. Such processes can produce capsules of adequate quality for carbonless business forms but not at greater then 40% solids and with equipment costs considerably higher than a pure batch process of equivalent capacity. U.S. Pat. No. 4,761,255 for example, teaches a semi-continuous process with the attendant necessity of controlling agitation and heat-up rates within narrow limits.

The process improvement of this invention is the interjection of a reaction period between the second and third steps, between emulsification and polyamine addition. It has been found that such a reaction period drastically reduces batch viscosity, permitting capsules to be made at higher solids without agglomeration. The conditions required for this reaction period vary primarily with droplet size and reactant concentration. In general, one hour at 40° C. is sufficient. Lower temperatures would require longer times and higher temperature would require shorter times. It is to be understood herein that the reaction period would typically encompass some continuing agitation to keep the various constituents in suspension. When making microcapsules for carbonless business forms, the oil phase is usually added warm, to prevent the precipitation of color-formers and isocyanate reactant, and emulsification to the required small droplet size requires considerable energy, with the result that the emulsion is often close to 40° C. when the high shear agitation is stopped. This means that no heat-up is required to reach the desired reaction temperature.

In the prior art relating to interfacial encapsulation, there is no teaching or recognition of benefit from a deliberate delay between the completion of emulsification and the addition of polyamine.

Some prior art suggests a delay between polyamine addition and the start of heat-up. Presumably, this is done to permit diffusion of the polyamine into the interfacial reaction zone before beginning the wall-tightening, high temperature reactions. However, such delay between addition and heat-up has not been found to provide a benefit in viscosity and is not critical to this invention.

The benefits of insertion of a reaction period between emulsification and polyamine addition have not been previously appreciated. Isocyanates are known to be water-sensitive. Conventional wisdom teaches away from the invention in that, intuitively, the emulsification would be desired to be conducted as rapidly as possible at the lowest possible temperature and the polyamine reactant should be added as soon as possible thereafter in order to avoid the loss of potential wall material to hydrolysis. It is quite surprising that delaying polyamine addition for two hours at elevated temperatures does not significantly affect capsule wall strength or impermeability while providing drastically reduced batch viscosity, permitting capsules to be made at higher solids without agglomeration.

The mechanism by which delayed polyamine addition provides lower viscosity appears based on isocyanate hydrolysis. When a large oil droplet is broken into smaller droplets by high shear agitation, some isocyanate material is expelled into the aqueous phase. At the end of the emulsification period, this aqueous phase isocyanate material is quite dispersed but still capable of being cross-linked by polyamines into a viscosity-building, agglomeration-causing network. The intervening reaction period accomplishes deactivation by hydrolysis of the dispersed, aqueous phase isocyanate without significantly affecting the bulk isocyanate material within the oil droplets.

Besides lowering viscosity and preventing agglomeration, delayed polyamine addition has additional benefits. In the prior art procedures employing immediate polyamine addition, such as taught in U.S. Pat. No. 4,761,255, strong agitation is required during and immediately after addition to prevent capsule agglomeration. This strong agitation while the capsule walls are soft and deformable results in highly distorted, non-spherical capsules. To have enough strength and impermeability for use in carbonless business forms, capsules made by this process require 10% or more isocyanate material based on the weight of oil phase. By contrast, capsules made by the delayed addition procedure are basically spherical and have properties suitable for carbonless business forms with quantities, for example, of less than 5% isocyanate material, based on the weight of oil phase.

Capsule slurry viscosity can be affected not only by solids and polymer concentration, but also by the harder to control variable of capsule size distribution. To isolate the effect of time of polyamine addition on slurry viscosity, three out of the four following examples are sets of batches made from one emulsion. The fourth example is large scale preparation in which emulsification and encapsulation are carried out in the same reactor.

EXAMPLE 1

The oil or internal phase had the following composition:

| component | trade name | chemical name | wt. % |
|---|---|---|---|
| aromatic solvent | Sure Sol 290 | primarily sec-butylbiphenyl | 53.0% |
| aliphatic solvent | Norpar 12 | refined petroleum solvent, primarily C12 n-paraffins | 40.0% |
| black color-former | Black XV | 6'-(diethylamino)-2'-[(2,4-dimethylphenyl) amino]-3'-methyl-spiro [isobenzofuran-1(3H), 9-[9H]xanthen]-3-one | 4.1% |
| blue color-former | PB-63 | 7-(1-ethyl-2-methyl-indole-3-yl)-7-(4-diethylamino-2-ethoxyphenyl)-5,7-dihydrofuro[3,4-b]-pyridine-5-one | 0.6% |
| red color-former | I6B | 3,3-bis(1-octyl-1-methylindol-3yl) phthalide | 0.3% |

The above composition was heated with stirring to 115° C. to obtain a clear solution and then allowed to cool slowly. When the temperature reached 95° C., 5 weight percent Desmodur N-3300 was added. Desmodur N-3300 is a medium viscosity (~3000 cps) isocyanate resin (21-22% —NCO) sold by Mobay Corporation, primarily the isocyanurate trimer of 1,6-hexanediisocyanate. The temperature of this internal phase plus reactant solution was allowed to fall to 70° C. before adding to the emulsifying medium in a gallon blender. At 70° C. the internal phase plus reactant solution was still essentially clear.

The emulsifying medium was a previously prepared aqueous solution of 1.5 parts Vinol 540 and 1.5 parts Vinol 203 per 80 parts of solution. Vinol 540 and 203 are incompletely (88%) hydrolyzed polyvinyl alcohols, 540 being high molecular weight and 203 being low molecular weight.

960 g of the above emulsifying medium at ambient temperature were weighed into a gallon Waring blender having a water-jacketed bottom and a speed controller. With speed set at 2000 rpm, 1260 g of the 70° C. internal phase plus isocyanate were quickly added. After 19 minutes at 2000 rpm, during which time emulsion temperature was maintained between 29° C. and 32° C. by adjusting the flow rate of cooling water through the blender jacket, most droplets appeared to be less than 10 micron diameter and the blender was stopped. 370 g of white, slightly foamy emulsion were weighed into each of four glass jars. Three of the reaction jars were placed in a 40° C. water bath and stirred with 2", flat-bladed agitators, turning at 300 rpm, just sufficient to keep all of the contents in movement. The fourth jar was agitated in the same manner but at room temperature. 20 g of a previously prepared 12 wt. % aqueous diethylenetriamine (DETA) (from Aldrich Chemical Co.) solution were immediately added as the aqueous phase reactant to the room temperature jar. After 10 minutes, another 20 g portion of the 12% DETA solution was added to the first jar in the 40° C. bath. After another 50 minutes, the third 20 g portion of the 12% DETA solution was added to the second jar in the 40° C. bath, the room temperature jar was placed in the 40° C. bath, and the bath temperature setting was raised to 70° C. Some 60 minutes after the start of heat-up, the bath temperature reached 70° C. and the last 20 g portion of 12% DETA was added to the third reaction jar. The water bath was kept at 70° C. for eight hours and then allowed to cool slowly overnight.

The next day, all four batches were brought to 56% solids by adding back the water lost as evaporation. Viscosities and pH's were measured at room temperature with the following results:

| batch | DETA addition time | pH | solids | Brookfield viscosity at 25° C. |
|---|---|---|---|---|
| A | immediately | 8.7 | 56% | 1325 cps |
| B | after 10 min at 40° C. | 8.7 | 56% | 1075 cps |
| C | after 60 min at 40° C. | 8.8 | 56% | 500 cps |
| D | after 60 min at 40° C. and 60 min to 70° C. | 8.8 | 56% | 530 cps |

Under a microscope, the capsules appeared to be dimpled spheres, average diameter was 8μ (8.0μ 50 vol % by Elzone 180 particle size analyzer manufactured by Particle Data Inc.) Capsules from batches A and C were formulated for hand coatings by blending 36 parts by weight wheat starch granules (added as stilt or protective spacers) and 12 parts by weight ethoxylated corn starch (pre-gelatinized, added as binder) per 100 parts of dry capsules. The coatings were applied by Meyer rod onto a 50g/m$^2$ base paper, dried with a heat gun and then subjected to standard tests after conditioning for at least one hour in a 50% RH, 72° F. room.

The first test was designed to measure resistance to accidental damage. The capsule coatings were mated with a phenolic resin-coated paper which reacts with the colorformers in the capsules to produce a black dye combination. The mated sheets were subjected to a pressure of 550 psi by means of a rubber diaphragm, backed by a flat metal plate, for 30 seconds. After 24 hours, the area on the receiver sheet exposed to the capsule coating under pressure was read on a standard paper opacimeter. The ratio of opacimeter readings on the receiver sheet in the test area to a blank area is a measure of the capsule coatings' resistance to accidental damage. For this test, called pressure smudge, the higher the ratio, the more resistant the capsule coating is to accidental damage.

The second test was designed to measure the capsule coatings' ability to make a carbonless print. The capsule coatings were mated with a carbonless receiver sheet as before but then typed on with a standard typewriter equipped with a solid block pattern key. Three one square inch areas are typed. After 24 hours, opacimeter readings are made in the typed areas of the receiver sheet. The average ratio of opacimeter readings in typed-on areas to blank areas is called typewriter intensity. For this test, the lower the ratio, the greater the capsule coatings' ability to print.

The third test was designed to measure the capsule coatings' ability to retain functionality with prolonged storage. For this test, the capsule coatings were exposed in a 100° C. oven for 72 hours. Then the typewriter intensity test, as described above, was performed. The change in typewriter intensity produced by 72 hours at 100° C., called oven decline, is an accelerated test of capsule impermeability. The lower the change, the more impermeable the capsule wall.

The results of these three tests on batches A and C were as follows:

| batch | polyamine addition | coat weight g-capsules per m$^2$ | pressure smudge | type-writer intensity | oven decline |
|---|---|---|---|---|---|
| A | immediate | 3.0 | 0.82 | 0.48 | +0.03 |
| C | after 60 min at 40° C. | 3.8 | 0.83 | 0.48 | +0.03 |

The above numbers show that the lower batch viscosity obtained by delayed polyamine addition was achieved without penalty in either capsule strength or impermeability. (g-capsules per m$^2$ is an abbreviation for grams of capsules per square meter.)

EXAMPLE 2

For emulsifying medium 1200 g of 1.5% Vinol 540 and 1.5% Vinol 203 in water were weighed into a gallon, constant-speed, jacketed Waring blender. The oil phase was prepared exactly as in Example 1, except the concentration of Desmodur N-3300 was increased to 10% on weight of color-former solution. At 70° C., when 1320 g were added to the blender, the oil phase was slightly turbid. Emulsification was 20 minutes at 2000 rpm, followed by 20 minutes at 2500 rpm, during which time, temperature was maintained between 22° C. and 32° C. 420 g of white, foamy emulsion were weighed into each of two reaction jars, both stirred by 2", flat-bladed agitators at 300 rpm, one in a 40° water bath and the other at room (23° C.) temperature. The aqueous phase reactant was a previously prepared 22% tetraethylenepentamine (TEPA)(from Aldrich Chemical Co.) solution, 40 g of which were added immediately to the room temperature reaction. After one hour, 40 g of the 22% TEPA solution were added to the batch in the 40° C. bath, the room temperature batch was transferred to the water bath and the bath temperature setting was raised to 70° C. Some fifty minutes after the start of heat-up, bath temperature was 66 C and it was noticed that the batch to which TEPA was added immediately after emulsification, had started to coagulate. Both batches were kept at 70° C. of eight hours and then allowed to cool slowly overnight. The next morning the batch to which TEPA had been added immediately after emulsification was a solid mass except for a cavity created by the stirrer blade. The other batch was a fluid (158 cps at 51.6% solids) slurry of single capsules, 5.6μ50 vol %, measured as in Example 1. This example shows that without delayed polyamine addition, some reaction conditions result in not just increased viscosity but irreversible capsule agglomeration.

EXAMPLE 3

896 g of 4% Vinol 203 in water were weighed into a gallon, constant speed, jacketed Waring Blender. The oil phase was prepared as in Example 1 with 5% Desmodur N-3300 on the weight of color-former solution. 1257 g of this slightly hazy solution at 70° C. were added slowly to the blender with speed at 2000 rpm. When all of the oil phase had been added, blender speed was increased to 2500 rpm and held at this speed for 15 minutes while temperature was maintained between 37° C. and 39° C. At the end of this period, 360 g of white emulsion was weighed into each of four glass jars. The jars were placed in a 40° C. water bath and stirred with 2", flat-bladed agitators, turning at 300 rpm. 4.4 ml of a previously prepared 50% diethylenetriamine (Aldrich Chemical Co.) solution were added immediately to the first jar. Fifteen minutes later, 4.4 ml of 50% DETA were added to the second jar. Forty-five minutes after that, 4.4 ml of the same 50% DETA solution were added to the third jar and the bath temperature setting was raised to 70° C. About 60 minutes after the start of heat-up, the bath temperature had reached 70° C. and 4.4 ml of the 50% DETA solution were added to the last jar. The water bath was held at 70° C. for eight hours and then allowed to cool slowly overnight. The next morning all four batches were brought to 60% weight solids by adding a small amount of water to each. Solids, which were checked by drying weighed samples 3 hours in a 100° C. oven, were found to agree with theoretical solids to within 0.1%. Average capsule diameter was 6.9μ50 vol % as determined in Example 1. FTIR scans run on dried films of all four batches, indicated the complete absence of isocyanate groups pHs and viscosities were measured with the following results:

| batch | Time (minutes) at 40° C. before DETA addition | pH | solids | Brookfield viscosity at 25° C. |
|---|---|---|---|---|
| A | none | 8.45 | 60% | 2200 cps |
| B | 15' | 8.25 | 60% | 1100 cps |
| C | 60' | 8.2 | 60% | 662 cps |
| D | 60' at 40° C. | 8.4 | 60% | 403 cps |

-continued

| batch | Time (minutes) at 40° C. before DETA addition | pH | solids | Brookfield viscosity at 25° C. |
|---|---|---|---|---|
| | 60' to 70° C. | | | |

All four batches were hand coated as in Example 1, but with 27 parts stilt and 9 parts binder starch per 100 parts dry capsules. The hand coatings were tested as in Example 1 with the following results:

| batch | polyamine addition | coat weight g-capsules per m$^2$ | pres-sure smudge | type-writer intensity | oven decline |
|---|---|---|---|---|---|
| A | immediate | 4.1 | 0.80 | 0.48 | +0.02 |
| B | after 15' at 40° C. | 4.0 | 0.80 | 0.48 | +0.04 |
| C | after 60' at 40° C. | 3.9 | 0.79 | 0.48 | +0.03 |
| D | after 2 hrs at 40° C.–70° C. | 3.4 | 0.86 | 0.51 | +0.04 |

The above numbers show again that the lower batch viscosities obtained by delayed polyamine addition were achieved without penalty in either capsule strength or impermeability. Since the color-former solution has a density of 0.865 g/cm3 at 25° C., the batches in this example were made at greater than 63 volume% internal phase, much higher than the examples in any other U.S. patent on interfacial encapsulation.

EXAMPLE 4

27 lbs of a 5% Vinol 540, 5% Vinol 203 water solution were weighed into a 30 gallon, jacketed reactor, followed by 45 lbs. water. The reactor was equipped with a 4", 3 bladed propeller driven by an air motor for low shear agitation and a 6", 4 bladed high shear agitator for emulsification. 91 lbs of a black color-former solution, similar to that used in Examples 1 to 3, were prepared at 105° C., were cooled to 77° C., and 5 wt% Desmodur N-3300 was mixed in. 96 lbs of this oil phase were added over a 5 minute period to the agitated polyvinyl alcohol solution in the 30 gallon reactor. Emulsification was 40 minutes at 1650 rpm with temperature between 33° C. and 38° C. The emulsion was warmed to 42° C. and stirred slowly for one hour before 1.1 lbs diethylenetriamine (Aldrich Chemical Co.) in 31.5 lbs of water solution were added. The reaction temperature was raised to 70° C. in one hour and held at 70° C. for eight hours. The finished capsule slurry had a 25° C. Brookfield viscosity of 135 cps at 50.6% solids. The capsules had an average diameter (50 vol%) of 8.2μ. FTIR scan on a dried film showed no isocyanate present.

The above interfacial capsules were formulated with stilt and binder starch and coated on a 50g/m$^2$ carbonless coating base with an air knife pilot coater. Commercial in-situ capsules containing the same color-former solution, were formulated and coated in the same manner. The standard tests described in Example 1 were performed on these two types of coating with the following results:

| capsule type | coat weight. g-capsules per m$^2$ | pres-sure smudge | type-writer intensity | oven decline |
|---|---|---|---|---|
| commerc. in-situ | 4.2 | 0.76 | 0.46 | +0.05 |
| interfacial with delayed polyamine addition | 4.2 | 0.83 | 0.46 | +0.02 |

The above numbers show that interfacial capsules made with delayed polyamine addition, have better accidental smudge resistance and better impermeability than commercial capsules made by an in-situ process.

In all of the above examples, the pre-reaction before polyamine addition was conducted at 40° C. 40° C. is a convenient temperature when making capsules for carbonless business forms but other temperatures can be used. However, below 30° C., the time required becomes impractically long and above 70° C., the loss of potential wall material becomes significant. At 35° C., a two hour reaction time would be sufficient. At 60° C., 15 minutes would suffice.

Unless otherwise indicated, all measurements are on the basis of weight and in the metric system.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

What is claimed is:

1. A process for producing an aqueous suspension containing at least 40% by weight of microcapsules comprising mixing an oil phase containing a colorless chromogenic material into an aqueous phase containing an emulsifying agent, droplet stabilizer or both, said oil phase being substantially immiscible in the aqueous phase and containing an oil phase reactant comprising an oil soluble film-forming polyisocyanate, agitating the mixture under high shear to form droplets of the oil phase of about 10 micron average diameter or less, then substantially reducing the rate of agitation and allowing the suspension to react for at least about 15 minutes at elevated temperature of at least 35° C., then adding an aqueous phase reactant comprising an aliphatic polyamine.

2. The process according to claim 1 wherein the polyisocyanate comprises 1,6-hexane diisocyanate trimerized into an isocyanurate ring structure.

3. The process according to claim 1, wherein the suspension is allowed to react from about 15 minutes to about 2 hours at a temperature range not less than 35° C. nor more than 70° C. before adding the aqueous polyamine solution.

4. The process according to claim 1, wherein the aliphatic polyamine is selected from the group consisting of diethylenetriamine and tetraethylenepentamine.

5. A process for producing by interfacial reaction an aqueous slurry of microcapsules, said process comprising the steps of mixing an oil phase containing a material to be encapsulated and an oil-soluble, film-forming, polyisocyanate into a continuous aqueous phase containing an emulsifying agent to form a mixture, emulsifying the mixture under high shear agitation until oil droplets of 10 microns or less are obtained, introducing a reaction period of at least 15 minutes at elevated temperature of at least 35° C. after the emulsifying step and before addition of an aliphatic polyamine whereby a nonagglomerated aqueous slurry of capsules of 10 microns or less average diameter is formed at greater than 40% by weight solids, and, then, adding, under reduced shear agitation, an aliphatic polyamine to form polyurea capsule walls followed by heating to harden the walls.

6. The process according to claim 5, wherein the introduced reaction period is not less than 15 minutes nor more than two hours at a temperature range not less than 35° C. nor more than 70° C.

7. The process according to claim 6, wherein the polyisocyanate comprises 1,6-hexane diisocyanate trimerized into an isocyanurate ring structure.

8. The process according to claim 7, wherein the aliphatic polyamine is selected from the group consisting of diethylenetriamine and tetraethylenepentamine.

* * * * *